(12) United States Patent
Gurusamy et al.

(10) Patent No.: US 11,733,712 B2
(45) Date of Patent: Aug. 22, 2023

(54) SYSTEMS AND METHODS FOR GENERATING DISPLAYS FOR NOISE ABATEMENT DEPARTURE PROCEDURES

(71) Applicant: HONEYWELL INTERNATIONAL INC., Morris Plains, NJ (US)

(72) Inventors: Saravanakumar Gurusamy, Bangalore (IN); Kantha Chikkegowda, Bangalore (IN); Ivan Wyatt, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 312 days.

(21) Appl. No.: 16/999,525

(22) Filed: Aug. 21, 2020

(65) Prior Publication Data

US 2022/0004202 A1   Jan. 6, 2022

(30) Foreign Application Priority Data

Jul. 3, 2020   (IN) ............................. 202011028403

(51) Int. Cl.
  *G05D 1/06*      (2006.01)
  *G08G 5/00*      (2006.01)
  (Continued)

(52) U.S. Cl.
  CPC ........... *G05D 1/0661* (2013.01); *B64D 31/06* (2013.01); *G01C 23/00* (2013.01); *G05D 1/106* (2019.05); *G08G 5/0065* (2013.01)

(58) Field of Classification Search
  CPC ........ B64D 43/00; B64D 43/02; B64D 45/00; G01C 23/00; G01C 23/005; G05D 1/0661;
  (Continued)

(56) References Cited

U.S. PATENT DOCUMENTS 4,019,702 A * 4/1977 Annin ................. G05D 1/0661
                                                    244/180
5,299,765 A * 4/1994 Blechen ............... G05D 1/0661
                                                    244/188
(Continued)

FOREIGN PATENT DOCUMENTS

DE   202012105058 U1 * 3/2013 ............ G01C 21/20

OTHER PUBLICATIONS

Airbus Customer Services, "Getting to grips with aircraft noise", Flight Operations Support & Line Assistance, Dec. 2003, 87 pages (Year: 2003).*

*Primary Examiner* — David A Testardi
(74) *Attorney, Agent, or Firm* — Lorenz & Kopf LLP (57) ABSTRACT

Methods and systems for generating a vertical situation display for a noise abatement departure procedure (NADP). Other NADP relevant displays are also disclosed including display of NADP parameters on altitude tape and primary flight displays, an NADP bug on an engine display and NADP status annunciations. The methods and systems include receiving NADP parameters entered into a flight management system (FMS) on a user interface of the aircraft system. The NADP parameters include: an initial altitude at which take-off thrust should be reduced to NADP thrust, an acceleration altitude at which the aircraft should begin accelerating to a final take-off speed whilst maintaining the NADP thrust, a climb excitement altitude at which a speed target is changed to the final take-off speed whilst maintaining the NADP thrust, and an end altitude at which the NADP should be exited. The methods and systems include generating a vertical situation display for a display device of the aircraft system indicating the NADP parameters on a flight path indication.

16 Claims, 9 Drawing Sheets

(51) Int. Cl.
  *G01C 23/00* (2006.01)
  *G05D 1/10* (2006.01)
  *B64D 31/06* (2006.01)
(58) Field of Classification Search
  CPC .. G08G 5/0021; G08G 5/0034; G08G 5/0039; G08G 5/0065
  See application file for complete search history.

(56) References Cited

U.S. PATENT DOCUMENTS

| | | | |
|---|---|---|---|
| 6,880,784 B1* | 4/2005 | Wilkinson | G05D 1/0661 244/76 R |
| 7,383,104 B2 | 6/2008 | Ishii | |
| 7,584,028 B2 | 9/2009 | Burnside | |
| 8,131,410 B2 | 3/2012 | Nikolic et al. | |
| 8,311,686 B2 | 11/2012 | Herkes et al. | |
| 9,483,052 B2 | 11/2016 | McGregor et al. | |
| 9,493,249 B2 | 11/2016 | Shukla | |
| 9,542,851 B1 | 1/2017 | Kim et al. | |
| 9,583,010 B1* | 2/2017 | Kolek | G08G 5/0065 |
| 9,696,724 B1* | 7/2017 | Arons | G05D 1/0202 |
| 10,584,979 B1* | 3/2020 | Gunn | G08G 5/0047 |
| 2005/0098681 A1* | 5/2005 | Berson | G08G 5/0052 244/1 N |
| 2005/0283281 A1* | 12/2005 | Hartmann | G01C 21/00 701/4 |
| 2008/0114503 A1* | 5/2008 | Burnside | B64D 31/06 701/3 |
| 2008/0312781 A1* | 12/2008 | Nikolic | G01D 7/04 701/14 |
| 2009/0132106 A1* | 5/2009 | DeJonge | G05D 1/0661 701/15 |
| 2009/0132107 A1* | 5/2009 | DeJonge | G05D 1/0661 701/15 |
| 2011/0060485 A1* | 3/2011 | Chaptai | G08G 5/0065 701/15 |
| 2011/0082605 A1* | 4/2011 | Coulmeau | G08G 5/045 701/14 |
| 2011/0118908 A1* | 5/2011 | Boorman | G08G 5/0021 701/14 |
| 2013/0092791 A1* | 4/2013 | Bakker | G05D 1/0653 244/1 N |
| 2013/0190950 A1* | 7/2013 | Shukla | B64D 45/00 701/3 |
| 2013/0238173 A1* | 9/2013 | Burns | G08G 5/0021 701/15 |
| 2014/0368359 A1* | 12/2014 | Johnson | G01P 1/10 340/969 |
| 2015/0362920 A1* | 12/2015 | McGregor | B64F 1/26 701/15 |
| 2018/0239364 A1* | 8/2018 | Meulle | G08G 5/0039 |
| 2018/0354636 A1* | 12/2018 | Darnell | B64C 19/00 |
| 2018/0366007 A1* | 12/2018 | Greenwood | G05D 1/0808 |
| 2020/0026307 A1* | 1/2020 | Lax | G08G 5/0021 |

* cited by examiner

| | |
|---|---|
| NADP Inactive | NADP is Defined and Inactive |
| NADP Armed | NADP is Armed and thrust is not reduce NADP thrust |
| NADP Active | NADP is Active and thrust is reduce to NADP thrust |
| NADP Exiting | NADP is Exiting and thrust is back to Normal |

FIG. 4A

| | |
|---|---|
| NOR EXIT | Exit due to reaching NADP End Altitude |
| EO EXIT | Upon Detection of Engine Out Condition |
| CR EXIT | Crew Manually Cancels of NADP Procedure |
| NC MODE | Due to Non-NADP Complaint |
| AT DIS | AT Disengage via Manual Override |
| MAX CLB | Pilot Pushes the Throttle to MAXCLB or Above |

SYSTEMS AND METHODS FOR GENERATING DISPLAYS FOR NOISE ABATEMENT DEPARTURE PROCEDURES

CROSS REFERENCE TO RELATED APPLICATION

This application claims priority to Indian Provisional Patent Application No. 202011028403, filed Jul. 3, 2020, the entire content of which is incorporated by reference herein.

TECHNICAL FIELD

The present disclosure generally relates to methods and systems for generating display cues for noise abatement departure procedures (NADPs). Further, the present disclosure relates to methods and systems for increasing situation awareness to a flight crew during NADPs.

BACKGROUND

During takeoff/departure procedures, aircraft may generate excessive noise due to engine thrust/vibrations. Noise disturbance can have significant adverse effects on people living close to an airport. To address the noise concerns, commercial aircraft must meet the International Civil Aviation Organization (ICAO) noise certification standards, which are detailed in ICAO Annex 16: Environmental Protection, Volume 1—Aircraft Noise. Since 1977, any new aircraft designs have been required to meet stricter (Chapter 3) or later standards. From 1 Jan. 2006, a more stringent standard (Chapter 4) has been applied for new aircraft designs.

NADPs incorporate noise abatement procedures as part of the takeoff roll and climb. One NADP includes the following principal requirements:
 a. Set Takeoff Power and Flaps Climbing at speed V2 plus to 800 feet (for example) altitude
 b. At 800 feet altitude, set reduced Climb Power for noise abatement with flaps in the take-off position
 c. Operate Constant Speed Climb to 1500 feet (for example) altitude
 d. At 1500 feet altitude, Reduce Pitch, Accelerate to final take-off speed and Retract Flaps on Schedule
 e. Set Constant Speed to final take-off speed to 3,000 feet (for example) altitude
 f. At 3000 feet altitude (for example), increase power and accelerate to en-route climb speed.

The specific altitude values for the NADP are configurable by, for example, the pilot.

It will be appreciated by the skilled person that there are various NADPs with respect to different regulations, different airports, different aircraft and different airline carriers. As such, specific NADP requirements described herein are provided by way of example.

Generally, NADPs include reduced engine thrust during takeoff after the aircraft reaches a predetermined altitude above ground and the engine thrust is restored to (about) full power after climbing to a higher predetermined altitude. In this way, engine noise at ground level is markedly reduced as compared to that which occurs during a full-thrust climbing maneuver.

NADPs may be executed automatically, semi-automatically or manually. In all cases, the flight crew would benefit from greater situation awareness during NADP operations. Such information would help a flight crew to anticipate normal changes in engine operation and reduce the stress of managing the aircraft during crucial flight periods.

Hence, it is desirable to provide systems and methods for increasing situation awareness to a flight crew during NADPs. Further, there should be consistency in display of NADP information across various information sources in a cockpit of an aircraft. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Methods and systems are disclosed herein for receiving NADP parameters entered into a flight management system (FMS) on a user interface of the aircraft system. The NADP parameters include: an initial altitude at which take-off thrust should be reduced to NADP thrust, an acceleration altitude at which the aircraft should begin accelerating to a final take-off speed whilst maintaining the NADP thrust, a climb excitement altitude/Auto VNAV at which a speed target is changed to the final take-off speed whilst maintaining the NADP thrust, and an end altitude at which the NADP should be exited. The methods and systems include generating a vertical situation display for a display device of the aircraft system indicating the NADP parameters on a flight path indication.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide visual cues related to NADPs to enhance the flight crew's situation and tactical awareness. An onboard Flight Management System (FMS) having access to Takeoff and Landing Data (TOLD) provides NADP data parameters for display on various display devices. The various display cues described herein are generated based on FMS data calculated by the FMS. In some embodiments, a Vertical Situation Display (VSD) depicts upcoming flight legs and depicts NADP reference points of the FMS computed NADP including an initial altitude, an acceleration altitude, a climb excitement altitude, and an end altitude. These NADP reference points on the VSD provide excellent awareness to the flight crew on the transition points to initiate, accelerate and finally to exit the NADP. The VSD may also include relevant annunciations such as current NADP segment.

In some embodiments, NADP bugs are provided on an altitude tape of a primary flight display (PFD) and/or a VSD. In one example, the altitude tape on the PFD on one or both of a head up display (HUD) and a head down display (HDD) and/or on the VSD depicts NADP bugs including the initial altitude, the acceleration altitude, the climb excitement altitude and the end/exit altitude.

In some embodiments, one or more NADP bugs are included on an engine display. According to various NADP standards, the engine thrust, and its associated indication N1, is reduced, which is described by data from the FMS. Reduction in N1 results in reduced noise, thereby allowing the aircraft to satisfy various NADP standards. An NADP bug on the engine display depicts an ideal/reduced N1 value. Further, in some embodiments, the NADP bug on an engine display is shown in different colors when a delta N1 (which corresponds to reduced engine thrust required by an NADP) is computed and inactive, when NADP is armed (at the initial altitude or when speed reaches to VFT-3 kts) and thrust reduction is active but not achieved and when the N1 thrust reduction is achieved. In an example, the N1 before NADP is 96.6%, delta N1 is 6.7 and the reduced thrust NADP N1 is 89.9%

In some embodiments, NADP Flight Mode Annunciations are displayed. An auto-throttle function may automate an NADP. Correspondingly, the auto-throttle related NADP flight mode annunciations could be included in the PFD. When taking off with auto-throttle engaged, an NADP armed and engaged indication could be displayed. An auto-throttle thrust limit mode may be displayed on a flight mode annunciator. After exiting NADP, the thrust limit annunciation may switch to the next valid mode such as MAXCLB. When taking off without auto-throttle engaged, the armed NADP auto-throttle thrust limit mode on the flight mode annunciator is displayed in different colors when NADP engine thrust is actively being reduced toward the NADP thrust target and when the NADP engine thrust target has been achieved. When the thrust is increased and NADP thrust is not adequately followed, the NADP mode is displayed in another color.

In some embodiments, NADP status annunciations are displayed. In addition to, or alternatively to, the above display cues, overall NADP status annunciations may be provided. The NADP status annunciations may be displayed on the VSD and/or the PFD and include a status annunciation that NADP is defined and inactive, a status annunciation that NADP is armed and thrust is being reduced toward NADP thrust, a status annunciation that NADP is active and that NADP thrust has been achieved and a status annunciation that NADP is exiting and thrust is back to normal. A color coding of the status annunciations may be included, which is made consistent with corresponding NADP indications as described above.

In some embodiments, NADP cancellation indications could be provided on the VSD (e.g. for a few seconds) when NADP is ended. The cancellation indication may indicate a reason for the closure of the NADP. NADP cancellation indications can include at least one of: exit due to reaching NADP end altitude, exit due to detected engine out condition, exit due to flight crew manual cancellation of NADP, exit due to non-NADP compliance, exit due to disengaging of auto-throttle and manual override, and exit due to pilot selecting throttle to full climb thrust or above.

Figure 1A:
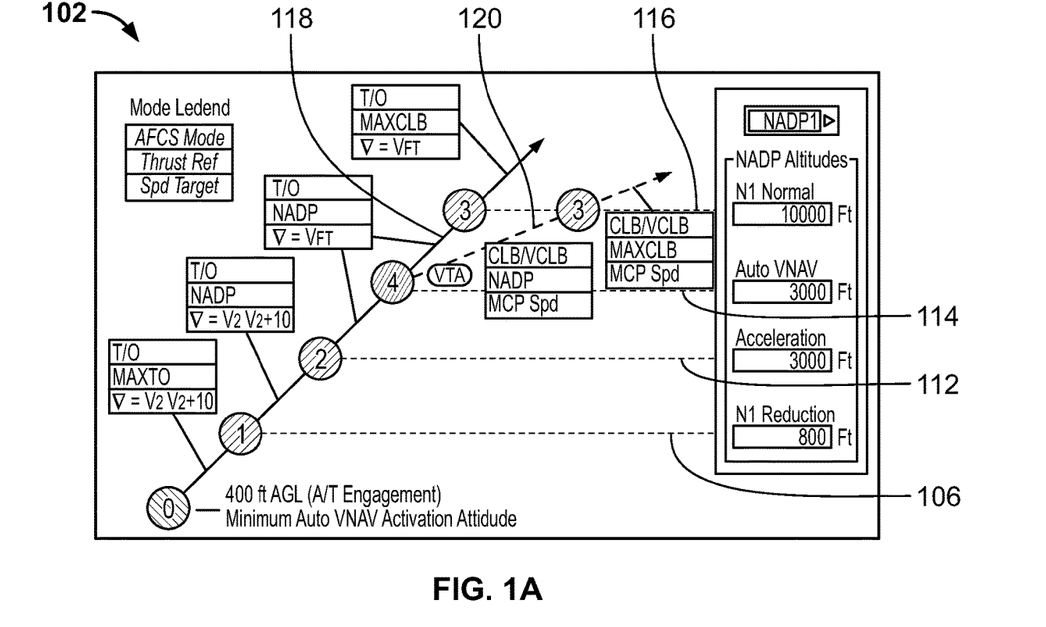
FIGS. 1A and 1B are diagrams illustrating typical NADPs.

FIGS. 1A and 1B show exemplary NADPs 100 for reference herein. FIG. 1A illustrates a first NADP (known as NADP1) 102. Per the mode legend illustrated in FIG. 1A, Automatic Flight Control System (AFCS) or autopilot mode, thrust setting and speed target are described at various phases of NADP1. After takeoff from the departure airport, the initial climb speed of an aircraft shall not be less than V2+10 kt. The aircraft takes off in take-off mode (T/O) with take-off thrust (MAXTO) set to achieve the initial climb speed. On reaching an initial altitude 106 (or N1 reduction altitude) at or above, for example, 240 m (800 ft) above airport level, thrust is reduced to NADP thrust to thereby reduce noise. A climb speed of V2+10 to 20 kt with flaps in the take-off configuration is maintained. At an acceleration altitude 112 of no more than an altitude equivalent to, for example, 900 m (3,000 ft) above airport level, while maintaining a positive rate of climb and NADP thrust, the aircraft commences acceleration to final take-off speed $V_{FTO}$ and the flaps are retracted on schedule. At a climb excitement altitude 114 (or VNAV altitude) of at least 900 m (3,000 ft) above airport level, speed is maintained at $V_{FTO}$ and the NADP thrust is maintained according to one version of NADP1 shown by projection 118. At a climb excitement altitude 114 (or VNAV altitude) of at least 900 m (3,000 ft) above airport level, speed is maintained at a Mode Control Panel setting and the autopilot mode is changed to Climb mode according to another version of NADP1 shown by projection 120. At the end altitude 116 (or N1 Normal altitude) of, for example, 10,000 feet, the thrust setting is changed to Climb thrust (MAXCLB) and the NADP is exited.

Figure 1B:
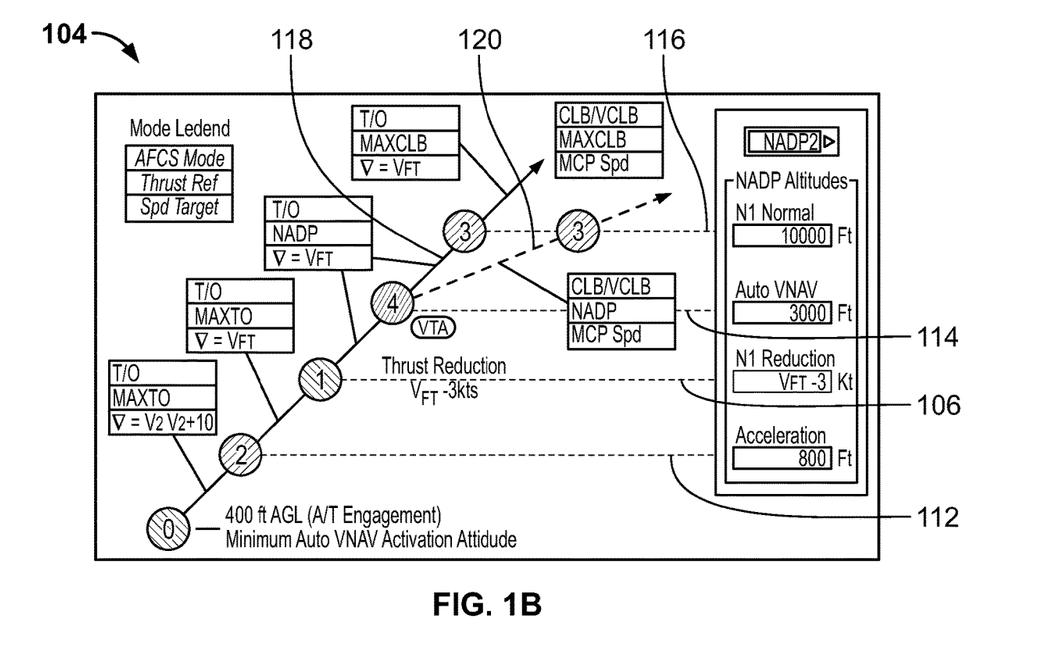

FIG. 1B illustrates a second NADP (known as NADP2) 104. As shown, the aircraft takes off from the departure airport and the initial climb speed of the aircraft shall not be less than V2+10 kt. The thrust setting is take-off thrust and the autopilot mode is take-off mode. Unlike NADP1, flaps are retracted on reaching the acceleration altitude 112, which occurs before the initial (or N1 reduction) altitude 106. At the acceleration altitude 112 of at least 800 feet, the aircraft is accelerated to a flaps up speed and the flaps are retracted on schedule. The aircraft target speed is set to final take off speed $V_{FTO}$. When the flaps are up, the aircraft is operated at the NADP thrust at the initial altitude 106 (the N1 reduction altitude) or when speed reaches the final take-off speed $V_{FTO}$–3 kts. At a climb excitement altitude 114 (or VNAV altitude) of at least 900 m (3,000 ft) above airport level, speed is maintained at $V_{FTO}$ and the NADP thrust is maintained according to one version of NADP1 shown by projection 118. At a climb excitement altitude 114 (or VNAV altitude) of at least 900 m (3,000 ft) above airport level, speed is maintained at a Mode Control Panel setting and the autopilot mode is changed to Climb mode according to another version of NADP1 shown by projection 120. At the end altitude 116 (or N1 Normal altitude) of, for example, 10,000 feet, the aircraft accelerates to en-route climb speed using a climb thrust setting. The specific altitude values for the NADP parameters for NADP1, NADP2 and other NADP operations are configurable by, for example, the pilot.

As described herein, acceleration altitude is where the aircraft accelerates to final take-off speed $V_{FTO}$ without changing engine thrust. The thrust is NADP thrust in NADP 1 and is take-off thrust in NADP2. The climb excitement altitude 114 is the altitude where autopilot will change to the FMS climb profile or the pilot actuates a CLIMB mode. The thrust mode does not change, only the climb/speed profile as programmed in the FMS or accomplished manually by the crew is changed. The climb excitement and acceleration altitudes 112, 114 result in noticeable aircraft state changes and it would enhance pilot situation awareness to have these parameters visualized during an NADP. At the climb excitement altitude (or Auto VNav altitude) and the accelerations altitude, the NADP target values unambiguously direct the changes or annunciate them when an autopilot or auto-thrust systems are in use. The clarity is operationally desirable as they reduce flight crew workload and increase safety.

Figure 2:
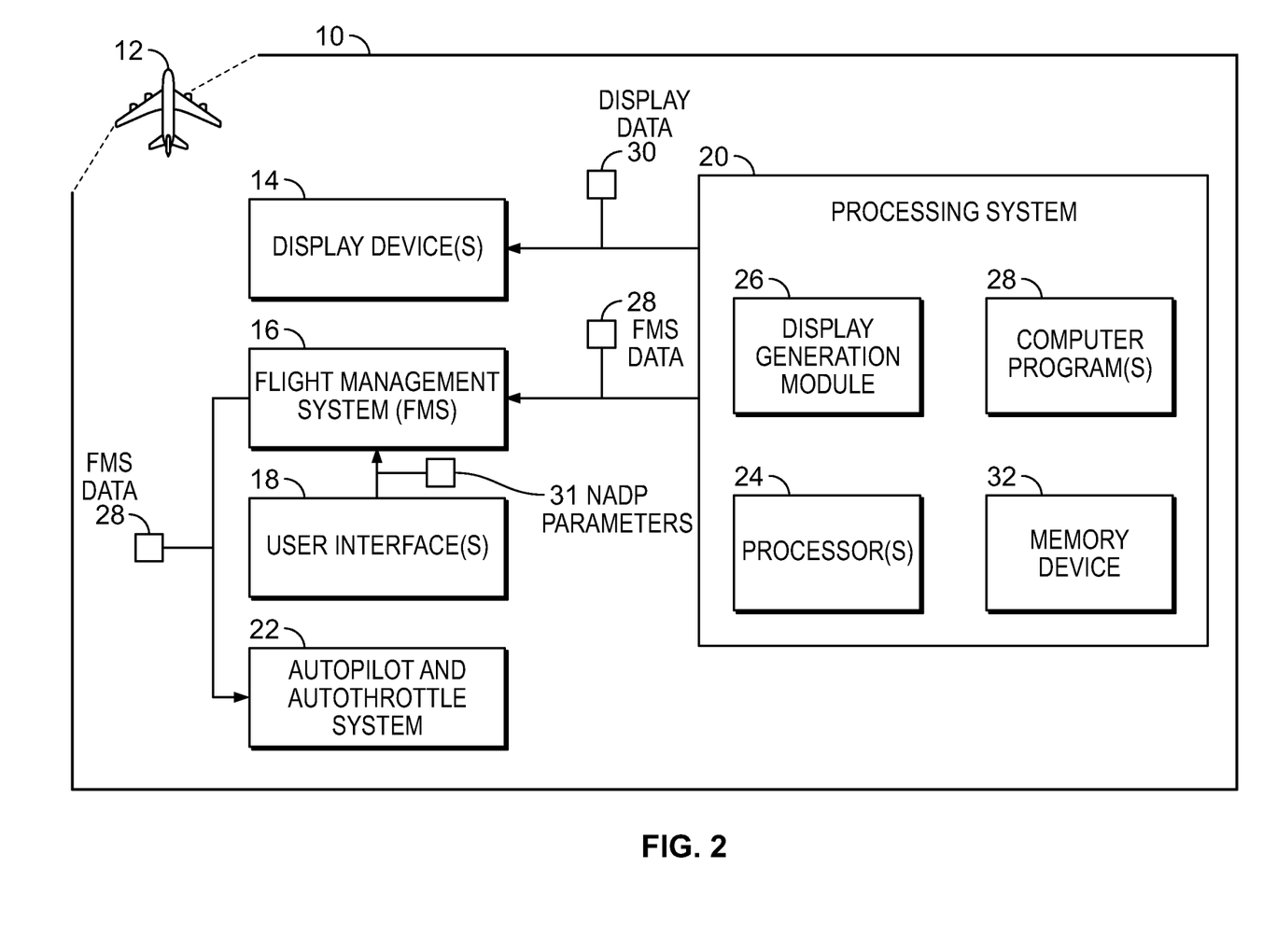
FIG. 2 is a block diagram of a system for generating displays for NADPs, in accordance with embodiments of the present disclosure.
Figure 3A:
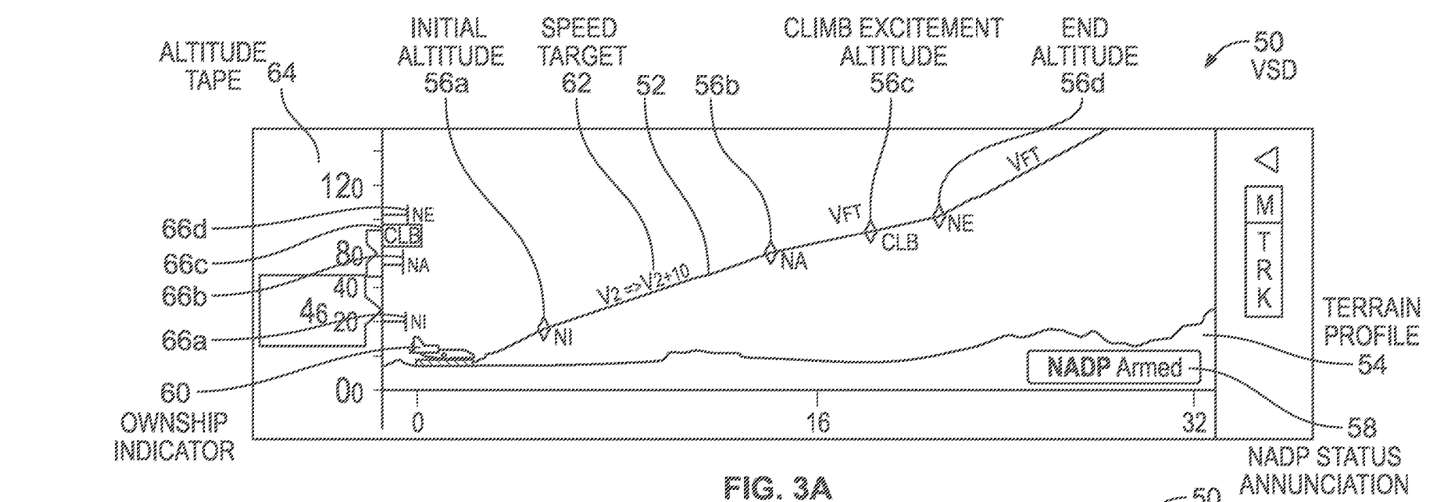
FIGS. 3A to 3D are exemplary vertical situation displays including NADP indications in association with a flight plan, in accordance with embodiments of the present disclosure.
Figure 3B:
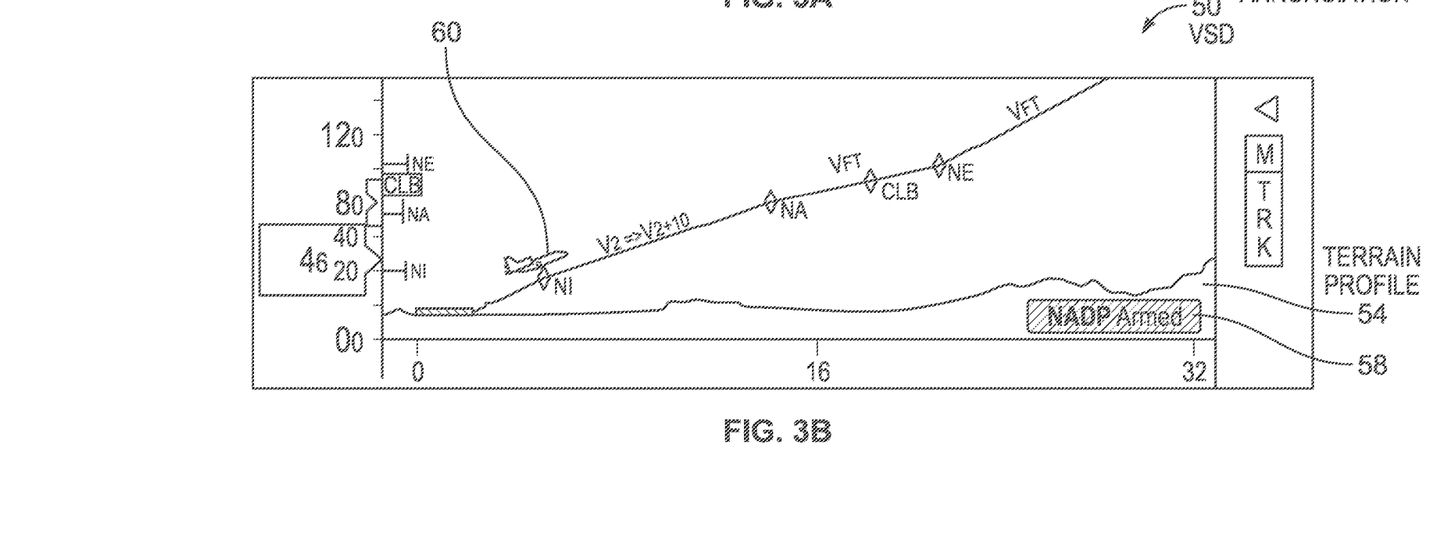
Figure 3C:
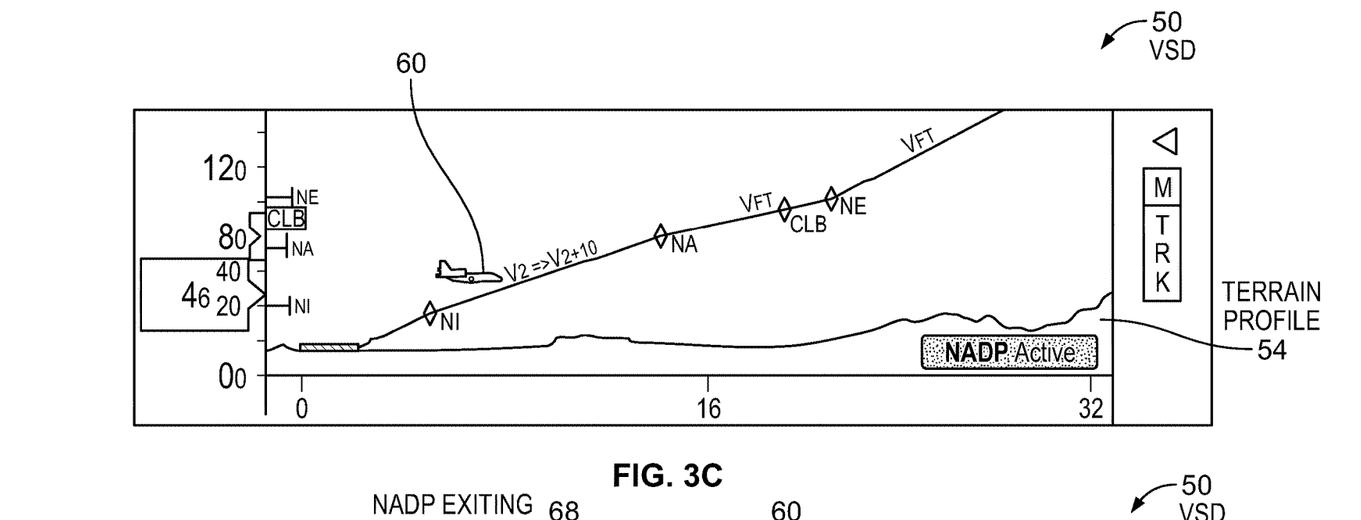
Figure 3D:
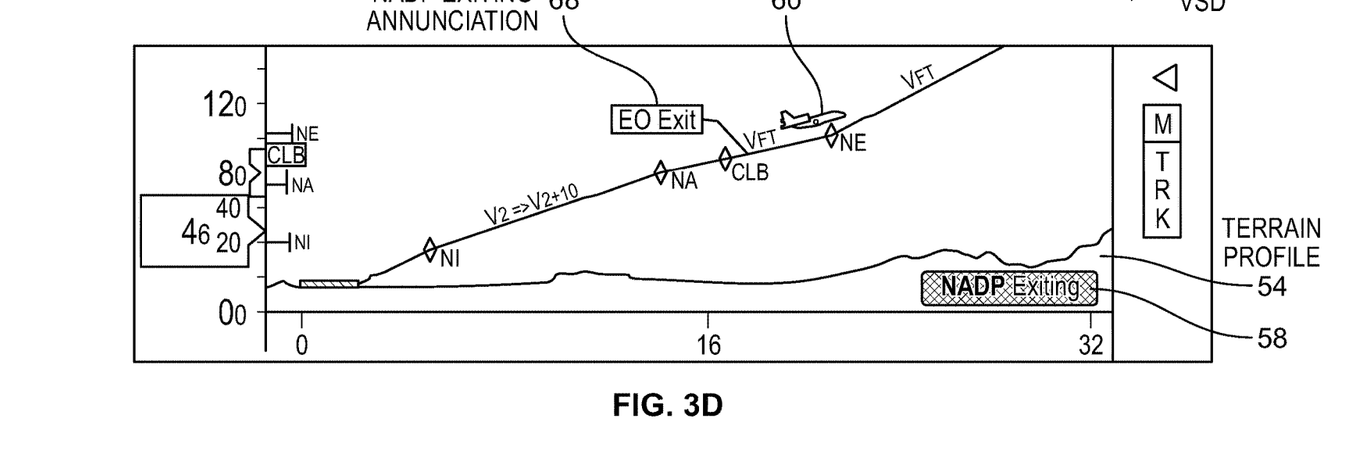

FIG. 2 is a schematic diagram of an aircraft system 10 of an aircraft 12. The aircraft system 10 includes an FMS 14, one or more user interfaces 18, an autopilot and auto-throttle system 22, and a processing system 20. It should be understood that FIG. 1 is a simplified representation of the aircraft system 10, and FIG. 1 is not intended to limit the application or scope of the subject matter in any way. In practice, the aircraft system 10 will include numerous other devices and components for providing additional functions and features, as will be appreciated in the art. In overview, the processing system 20 receives FMS data 28 describing flight modes, autopilot and auto-throttle settings, a flight plan including an NADP portion and position of the aircraft 12 along the flight plan. The processing system 20 determines upon a variety of NADP display parameters and generates graphics for visualizing those NADP display parameters on the display device or devices 14. The NADP display parameters allow enhanced situation awareness during the various noticeable system transitions as the aircraft 12 follows the NADP.

In embodiments, the aircraft 12 includes a cockpit, one or more engines, and a fuselage. The aircraft 12 can be a multicopter (or rotary-wing), fixed-wing or a tilt-wing aircraft. The aircraft 12 can be an airplane or a helicopter or other aircraft with powered rotors, such as cyclogyros/cyclocopters and tiltrotors. The aircraft 12 may be fully electric or hybrid powered and can include jet engines or propellers. The aircraft 12 may be a VTOL (Vertical Take-Off and Landing) or eVTOL (electric VTOL).

In embodiments, the aircraft system 10 includes an autopilot and auto-throttle system 22. An autopilot automates tasks such as maintaining an altitude, climbing or descending to an assigned altitude, turning to and maintaining an assigned heading, intercepting a course, guiding the aircraft between waypoints that make up a route programmed into the FMS 16, and flying a precision or nonprecision approach. The autopilot includes a set of servo actuators that execute the control movement and the control circuits to make the servo actuators move the correct amount for the selected task. The autopilot further includes a flight director (FD), which provides computational power to accomplish flight tasks including receiving navigational data, FMS data 28, environmental data, selected autopilot and data from other data sources and calculates the commands needed to operate the aircraft 12 as desired. Most flight directors accept data input from the air data computer (ADC), Attitude Heading Reference System (AHRS), navigation sources, the pilot's control panel, and the autopilot servo feedback, to name some examples.

An auto-throttle (automatic throttle, also known as auto-thrust, A/T) is a system that allows a pilot to control the power setting of an aircraft's engines by specifying a desired flight characteristic, rather than manually controlling the fuel flow. The auto-throttle can greatly reduce the pilots' work load and help conserve fuel and extend engine life by metering the precise amount of fuel required to attain a specific target indicated air speed, climb speed, or the assigned power for different phases of flight. In a speed mode of the auto-throttle, the throttle is positioned to attain a set target speed. This mode controls aircraft speed within safe operating margins. In a thrust mode of the auto-throttle, the engine is maintained at a fixed power setting according to a particular flight phase. For example, during takeoff, the A/T maintains constant takeoff power until takeoff mode is finished. During climb mode, the A/T maintains constant climb power; and so on. When the A/T is working in thrust mode, speed is controlled by pitch (or the control column), and not by the A/T. The autopilot and auto-throttle system 22 can work together to fulfill most, if not all, of the flight plan. Although both auto-throttle and autopilot is envisaged to be included in the aircraft system 10, it is possible that one or both sub-systems are excluded. The present disclosure has particular application with automated piloting and/or throttle systems, but is also of utility with manual or semi-manual operation of the aircraft 12. Modes of the autopilot and auto-throttle system 22 of relevance to NADP are depicted by the display device 14 for enhanced pilot situation awareness when flying the NADP. The autopilot and auto-throttle system 22 receives the FMS data 28 and determines throttle and mode settings on schedule according to the flight plan based at least partly on the FMS data 28.

In various embodiments, the FMS 16, in cooperation with a navigation system (not shown) and a navigation database (not shown), provides real-time flight guidance for the aircraft 12. The FMS 16 is configured to compare the instantaneous position and heading of the aircraft 12 with the prescribed flight plan data for the aircraft 12. To this end, in various embodiments, the navigation database supports the FMS 16 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 16 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 16 may be a source for the real-time aircraft state data of the aircraft 12. Based on a flight plan entered into the FMS 16 by a pilot through the user interface 18 and/or from an automated application, a computer of the FMS calculates the distances and courses between all waypoints in the entered route. During flight, the FMS provides precise guidance between each pair of waypoints in the route, along with real-time information about aircraft course, groundspeed, distance, estimated time between waypoints, fuel consumed, and fuel/flight time remaining (when equipped with fuel sensor(s)) and other information. The FMS 16 provides FMS data 28 describing the real-time information. Of particular relevance to the present disclosure is that the FMS 16 has access to TOLD (not shown) and provides detailed information about the NADP to be followed by the aircraft 12 and the progression of the aircraft 12 along the NADP to allow various NADP display cues described herein to be generated.

In embodiments, the user interface 18 provides input to one or more system(s) of the aircraft 12. The user interface 18 includes any device suitable to accept input from a user for interaction with the systems of the aircraft 12. For example, the user interface 18 includes one or more of a keyboard, joystick, multi-way rocker switches, mouse, trackball, touch screen, touch pad, data entry keys, a microphone suitable for voice recognition, and/or any other suitable device. The user interface 18 allows a user (e.g. a pilot) to enter various NADP parameters 31 including initial altitude, acceleration altitude, climb excitement altitude and end altitude. The NADP parameters 31 may be entered through a user interface of a flight management controller (FMC). In other embodiments, the NADP parameters 31 are at least partly automatically determined by the FMS 16 based on the NADP defined in the flight plan. It should be appreciated that the specific values of the NADP parameters 31 will vary depending on the NADP being followed, the airline carrier, the aircraft, pilot preferences, etc.

In embodiments, the display device 14 (or plural display devices 14) includes a head down display (HDD), a head up display (HUD), a wearable HUD, a portable display or any combination thereof. The display device 14 may be a VSD or a PFD or both may be provided. The display device receives display data 30 from the processing system 20 for generating the various NADP displays described herein. The display data 30 may include a VSD including NADP parameters, NADP bugs on altitude tapes of the VSD and/or the PFD, an NADP bug on an engine display, NADP annunciations of the autopilot and auto-throttle system 22, NADP status annunciations on the VSD and/or the PFD, etc.

Figure 8:
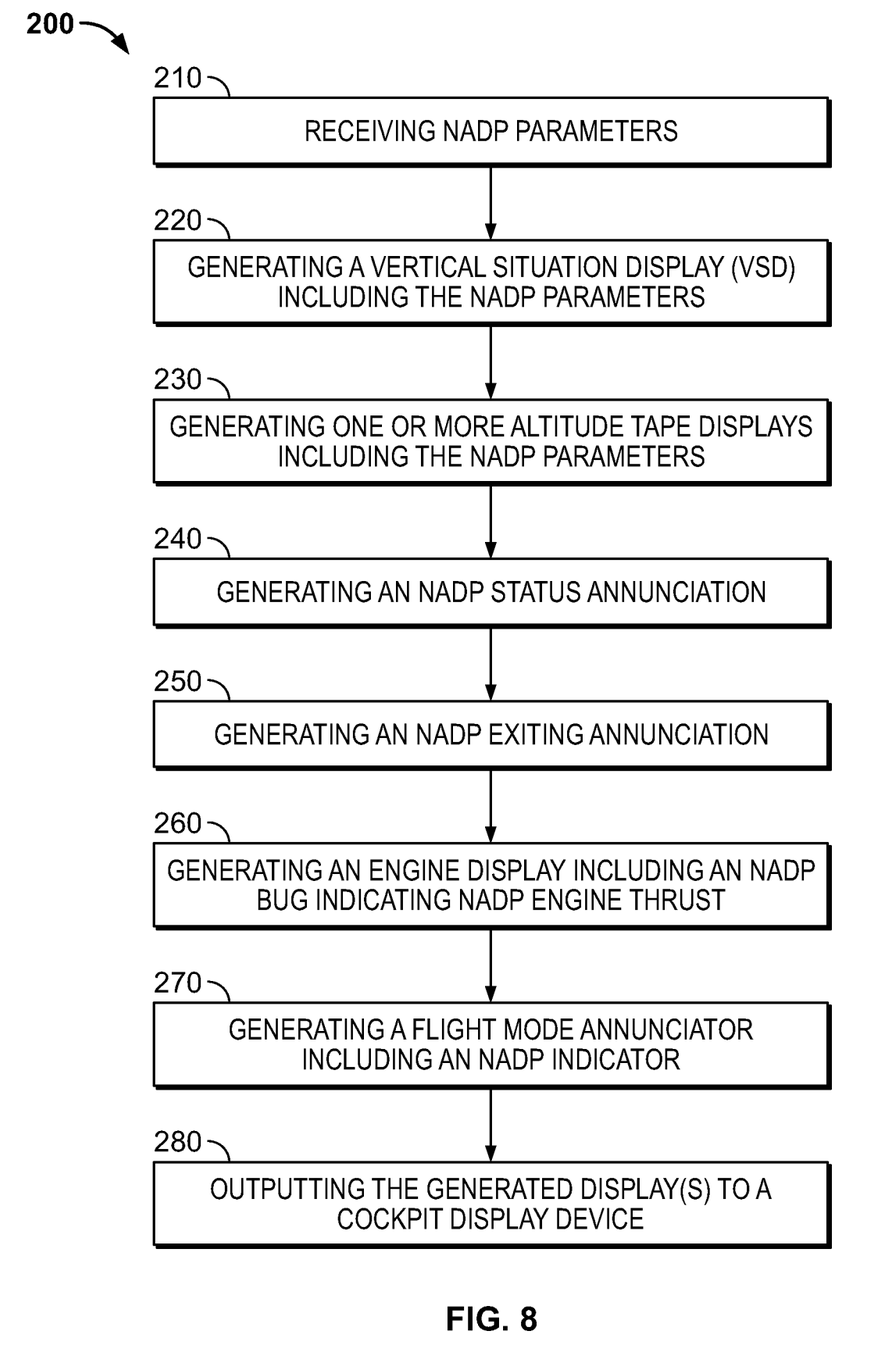
FIG. 8 is a flow chart of a method of generating displays for NADPs, in accordance with embodiments of the present disclosure.

In embodiments, the processing system 20 implements functions of the aircraft system 10 of FIG. 1 and steps of the method 200 of FIG. 8 according to example embodiments of the present disclosure. The processing system 20 includes one or more processor(s) 28 and one or more memory device(s) 32. The one or more processor(s) 24 can include any suitable processing device, such as a microprocessor, microcontroller, integrated circuit, logic device, or other suitable processing device. The one or more memory device(s) 32 can include one or more computer-readable media, including, but not limited to, non-transitory computer-readable media, RAM, ROM, hard drives, flash drives, or other memory devices. It should be appreciated that the functions of the FMS 16 and the autopilot and auto-throttle system 22 described above could be included in the processing system 20.

The one or more memory device(s) 32 can store information accessible by the one or more processor(s) 24, including one or more computer program(s) 28, which include computer-readable instructions that can be executed by the one or more processor(s) 24. The instructions can be any set of instructions that, when executed by the one or more processor(s) 24, cause the one or more processor(s) 24 to perform operations. The instructions can be software written in any suitable programming language or can be implemented in hardware. In some embodiments, the instructions can be executed by the one or more processor(s) 24 to cause the one or more processor(s) 28 to perform operations, such as the operations for generating displays including NADP visual cues as shown in FIGS. 3 to 7, otherwise implementing the aircraft system 10 and performing the computer implemented steps of method 200 of FIG. 8. Although the display generation module 26 is shown separately from the computer program 28, it is envisaged that the processor 24 implements display generation module 26 by executing the computer program 31 (or computer programs).

In embodiments, the processing system 20 includes the display generation module 26, which generates the NADP displays described herein with respect to FIGS. 3 to 7 based at least partly on the FMS data 28. The display generation module 26 includes NADP relevant parameters into a VSD as shown in FIGS. 3A to 3D at locations along a vertical flight plan, the NADP relevant parameters on altitude tapes of a VSD or PFD as shown in FIGS. 3A to 3D and 5A and 5B, NADP status indications into a VSD or PFD as shown in FIGS. 3A to 3D and 4A and 4B, engine indicator bugs describing NADP thrust parameters according to FIGS. 6A to 6C and flight mode annunciations including NADP flight mode and auto-throttle indications as illustrated in FIGS. 7A and 7B. It should be appreciated that the NAPD display cues described herein with reference to FIGS. 3 to 7 could be included in the aircraft system 10 independently or in any combination.

FIGS. 3A to 3D illustrate VSDs 50 including NADP indicators, in accordance with embodiments of the present disclosure. The VSDs 50 include a vertical profile 52 illustrating a vertical path to be taken by the aircraft 12. The vertical profile 52 is determined according to flight plan data included in the FMS data 28. The flight plan data describes vertical position (altitude) of the aircraft 12 as the aircraft 12 traverses the flight plan. The VSDs include a terrain profile 54, which is generated based on data from a terrain database (not shown). To one side of the vertical profile 52, is an altitude tape 64 presenting a current altitude of the aircraft 12, which can be based on altitude data included in the FMS data 28. Further, the VSD includes an ownship indicator 60 indicating a current location of the aircraft 12 along the vertical profile 52 based on location data included in the FMS data 28.

In addition to typical display features of a VSD, the VSDs 50 of exemplary embodiments of the present disclosure include NADP related indicators. In one embodiment, points are graphically depicted and labelled along the vertical profile 52 at different interesting altitudes along the vertical profile 52. In embodiments, at least one of the following NADP altitude points are included on the vertical profile 52: an initial altitude 56a, an acceleration altitude 56b, a climb excitement altitude 56c and an end altitude 56d. As described elsewhere herein, the initial altitude 56a (or the N1 reduction altitude 56a) is the altitude at which the NADP commences and engine thrust is reduced from take-off thrust to NADP thrust. The acceleration altitude 56b is the altitude at which the aircraft should begin accelerating to a final take-off speed $V_{FTO}$ while maintaining NADP thrust when following NADP1 as shown (but using take-off thrust when following NADP2). The climb excitement altitude 56c (or Auto VNAV/Vertical Navigation altitude 56c) is the altitude at which the FMS 16 changes to a climb mode, yet NADP thrust is maintained. The end altitude 56d (or N1 normal altitude) is the altitude at which the NADP is exited and thrust is increased from the NADP thrust. In embodiments, the NADP altitude points 56a-56d are diamond, circular or square shaped and located on the line indicating the vertical profile 52. Further, shorthand text labels are included for each NADP altitude point including, as examples, NI for initial altitude, NA for acceleration altitude, CLB for climb excitement altitude and NE for end altitude.

Figure 5A:
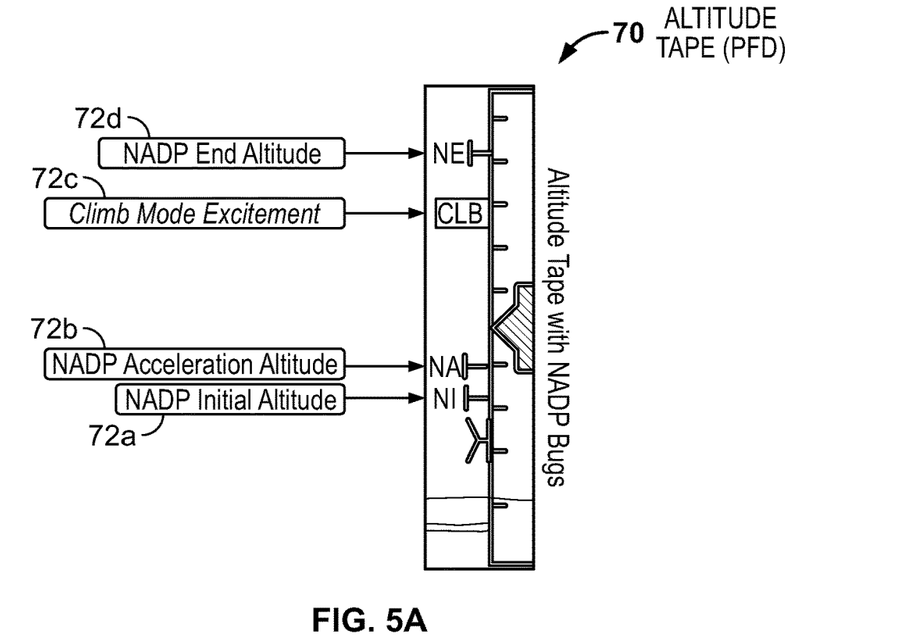
FIGS. 5A and 5B are exemplary altitude tapes with NADP indications, in accordance with embodiments of the present disclosure.

In accordance with various embodiments, the altitude tape 64 includes markings 66a to 66d thereon indicating each of the NADP altitudes of interest, specifically an initial altitude marking 66a, an acceleration altitude marking 66b, a climb excitement altitude marking 66c and an end altitude marking 66d. The markings 66a to 66d include laterally extending lines and associated shorthand text for the NADP altitude being marked such as NI, NA, CLB and NE. The NADP altitude markings on the altitude tape of the VSD are shown in further detail in FIG. 5B. The same or similar NADP altitude markings 72a to 72d may additionally or alternatively be included on the altitude tape of a PFD as shown in FIG. 5A.

In other embodiments, NADP parameters may be included on a speed tape of the VSD and/or the PFD.

In accordance with various embodiments, the VSDs 50 of the present disclosure include speed target indicators 62 along the vertical profile 52 to indicate the speed target prescribed by the NADP at a given segment of the vertical profile. In the embodiments of FIGS. 3A to 3D, the speed target indicators 62 include V2=>V2+10 for the NADP segment between the initial altitude point 56a and the acceleration altitude point 56b and the speed target of $V_{FT}$ (or $V_{FTO}$) for all other NADP segments.

Figure 4A:
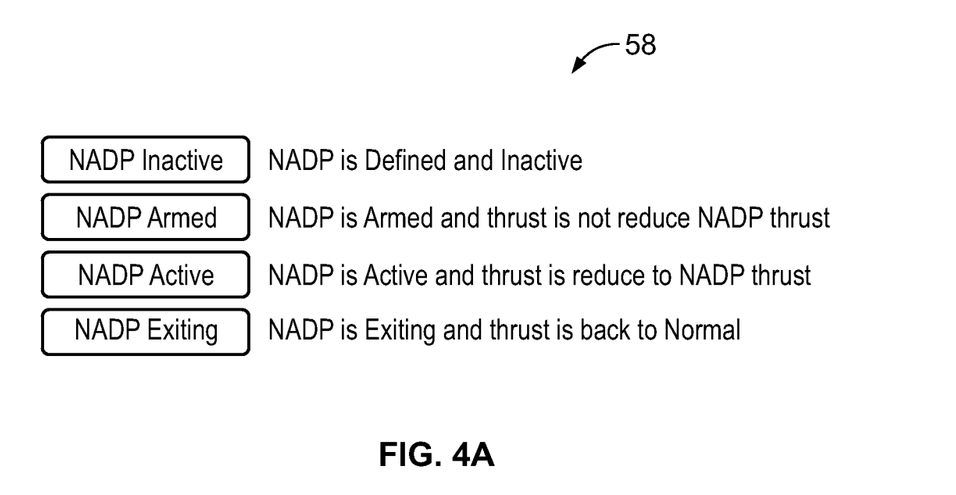
FIGS. 4A and 4B are exemplary NADP related annunciations, in accordance with embodiments of the present disclosure.

In accordance with embodiments, the VSDs 50 of the present disclosure include NADP status annunciations 58 and NADP exiting annunciations 68. Such annunciations may additionally or alternatively be included in the PFD. With continued reference to FIGS. 3A to 3D and with additional reference to FIGS. 4A and 4B, various exemplary NADP status annunciations 58 and NADP exiting annunciations 68 are displayed. The display generation module 26 generates the display to include the relevant NADP status annunciation 58 and/or NADP exiting annunciation 68 based on NADP status information derived from the FMS data 28. Referring to FIG. 4A, the NADP status annunciations include at least one of: NADP Inactive, NADP Armed, NADP Active and NADP Exiting. NADP inactive is indicated when an NADP has been defined (e.g. planned in the flight plan), but not yet activated (e.g. through pilot manual selection). Definition of the NADP may involve pilot entry of the NADP altitudes through the user interface 18 (e.g. through an FMC). NADP armed is indicated when NADP has been defined and armed (e.g. through pilot manual selection) but the aircraft 12 has not yet reached the initial altitude. NADP active is indicated when the thrust has been reduced to the NADP thrust and the aircraft 12 is currently flying in an NADP region (i.e. between the initial altitude and the end altitude). NADP exiting is indicated when the NADP is approaching or has crossed the end altitude and thrust is being increased from the NADP thrust to normal thrust. The text of the NADP status annunciations 58 may be presented within a box and located at a periphery of the VSD 50.

Figure 4B:
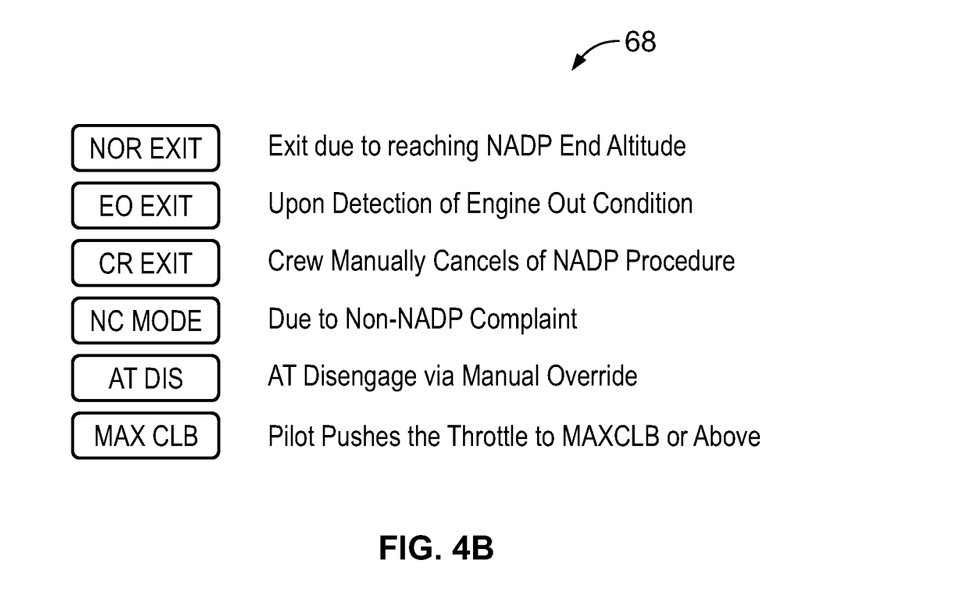

The NADP exiting annunciations include at least one of: NOR Exit, EO Exit, CR Exit, NC Mode, AT DIS and Max CLB. NOR Exit is indicated when the NADP exit is due to the aircraft reaching the end altitude. EO Exit is indicated when NADP is exited because of an engine out condition. CR Exit is indicated when the crew manually cancels the NADP by selection through the user interface 18. NC Mode is indicated when the NADP is exited due to the aircraft 12 not flying in compliance with the defined NADP. AT DIS is indicated when the NADP is exited due to auto-throttle being disengaged by manual override. MAX CLB is indicated when the NADP is exited due to pilot selection of MAXCLB throttle through user interface 18, which is above NADP thrust. Additional or alternative exit reasons for NADP exiting could be indicated by the NADP exiting annunciations 68. The NADP exiting annunciation 68 may be located along the vertical profile 52 of the VSD 50 or along a flight plan indication of the PFD according to the location of the exiting event. The text of the NADP exiting annunciation 68 may be included in a box.

Figure 6A:
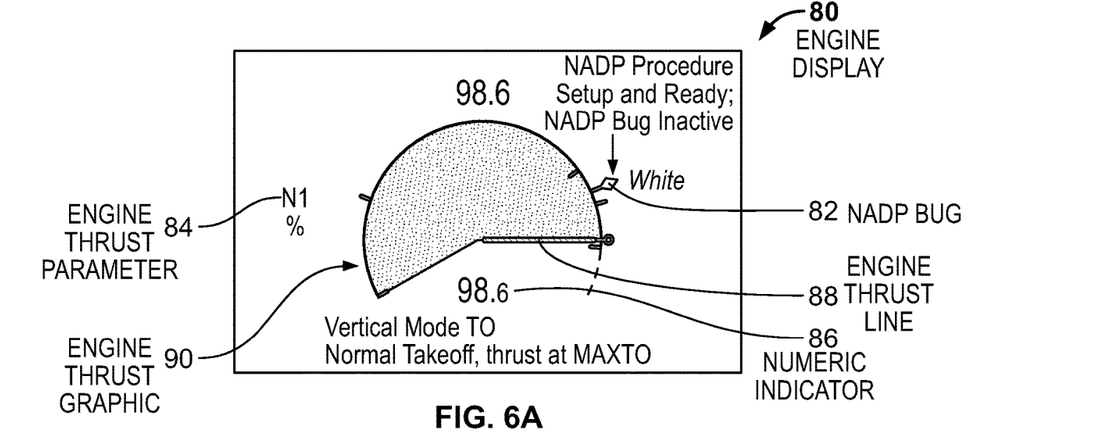
FIGS. 6A to 6C are exemplary engine displays including NADP indications, in accordance with embodiments of the present disclosure.
Figure 6B:
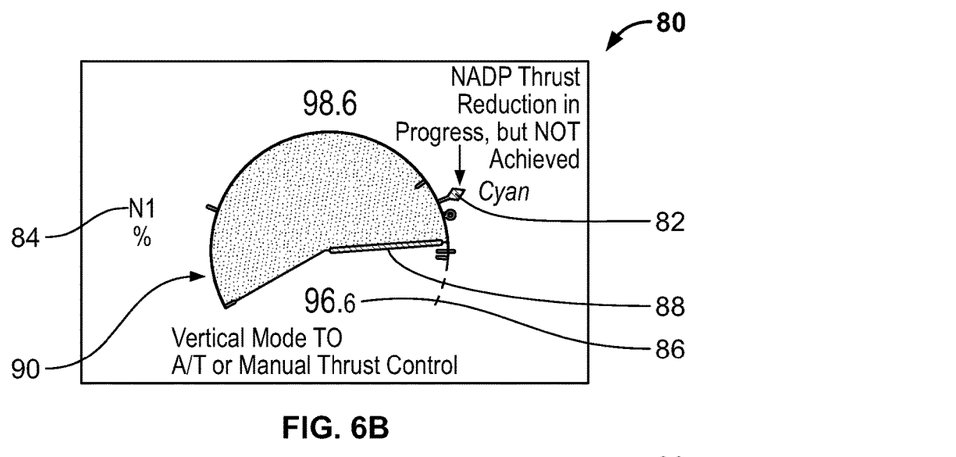
Figure 6C:
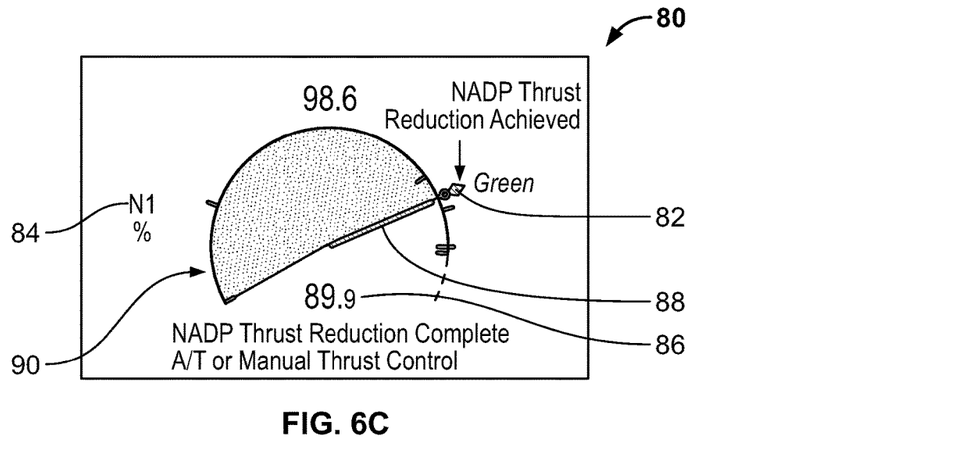

In accordance with various embodiments of the present disclosure, FIGS. 6A to 6C illustrate an NADP bug 82 included in an engine display 80. The engine display 80 includes an indicator of the engine thrust parameter 84 that is being displayed. In the exemplary embodiment, the engine thrust parameter is N1 percentage. The engine display 80 includes an engine thrust graphic 90 that depicts the engine thrust parameter. In the exemplary embodiment, a dial type scale is used as a primary aspect of the engine thrust graphic 90 and an engine thrust line 88 is included to indicate the current engine thrust on the dial. The engine display 80 further includes a numeric indicator 86 for the current engine thrust. The NADP bug 82 provides a reference point as a target for NADP engine thrust reduction and further to indicate a current status of the NADP.

In embodiments, the NADP bug 82 is located on a scale of engine thrust indicated by the engine thrust graphic 90 at a position corresponding to the prescribed NADP engine thrust. The target NADP engine thrust indicated by the NADP bug 82 can be obtained from the FMS data 28. Further, the NADP bug 82 is differentiated in dependence on a current status of the NADP. In embodiments, at least some of the following NADP statuses are indicated by the NADP bug 82: NADP is defined and inactive (e.g. by coloring the NADP bug 82 differently from the other indicated statuses as shown in FIG. 6A), NADP is armed and thrust is being reduced to NADP thrust but the complete thrust reduction has not yet been achieved (e.g. by coloring the NADP bug 82 differently from the other indicated statuses as shown in FIG. 6B) and NADP is active and NADP thrust is realized (e.g. by coloring the NADP bug 82 differently from the other indicated statuses as shown in FIG. 6C). The NADP thrust is armed at the initial altitude. In FIG. 6A, the engine is operating at take-off thrust, which is shown to be (in this example) 98.6% N1. In FIG. 6B, the engine thrust is in the process of being reduced to NADP thrust, which is shown to be 96.6% N1 (in this example). In FIG. 6C, NADP thrust reduction is complete and NADP thrust is shown to be 89.9% N1 (in this example). Engine thrust may be set automatically through the autopilot and auto-throttle system 22 or manually by a pilot through the user interface 18.

Figure 7A:
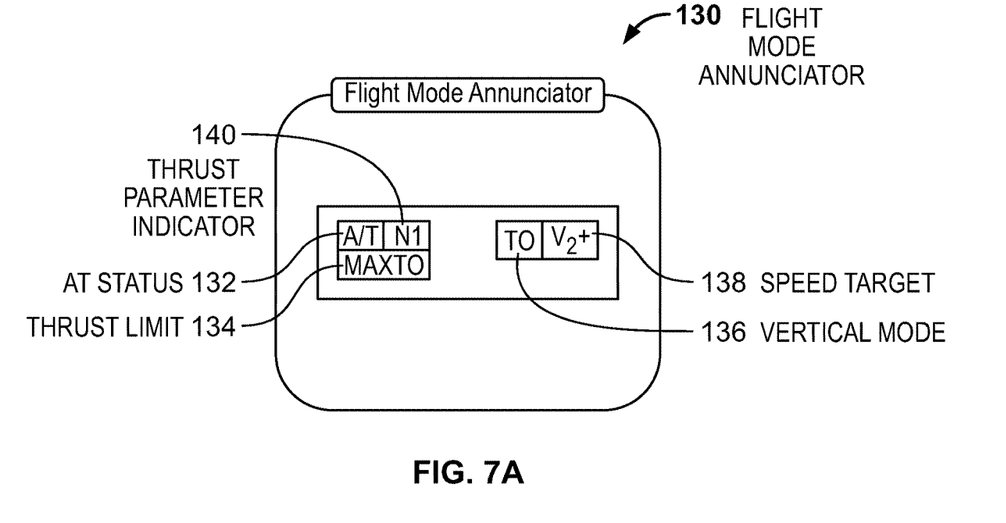
FIGS. 7A and 7B are exemplary flight mode annunciator including NADP related indications, in accordance with embodiments of the present disclosure.
Figure 7B:
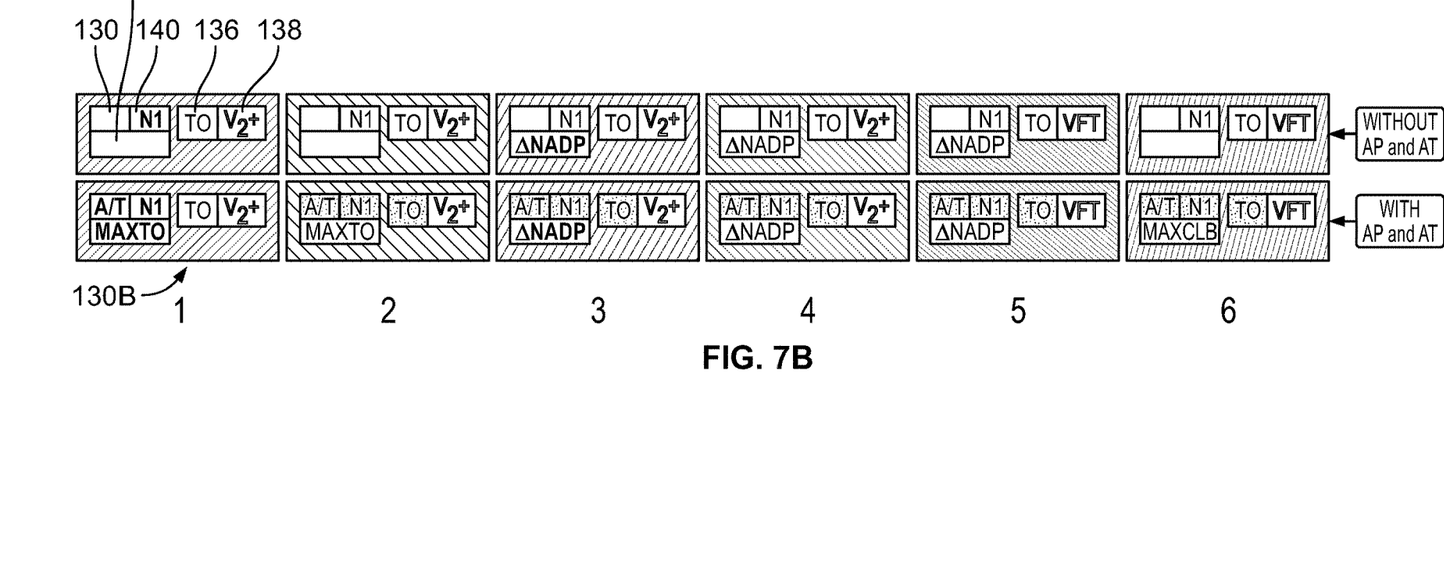

Referring to FIGS. 7A and 7B, an exemplary flight mode annunciator 130 is shown including a display of NADP relevant parameters, in accordance with an exemplary embodiment. In FIG. 7A, the flight mode annunciator 130 includes a vertical mode indicator 136. In the exemplary embodiment, the vertical mode is indicated as being "TO", corresponding to take-off. The flight mode annunciator 130 includes a speed target indicator 138. In the exemplary embodiment, the speed target is indicated as being V2+ or VFT, which are the NADP relevant speed target of V2→V2+ 10 or final take-off speed, respectively. The flight mode annunciator 130 includes an auto-throttle status indicator 132, which indicates whether the auto-pilot and auto-throttle system is engaged or whether the aircraft 12 is being flown under manual operation. In the exemplary embodiment, A/T is shown when auto-throttle is engaged and the indicator goes blank when A/T is not engaged. The flight mode annunciator 130 includes a thrust limit indicator 134, which indicates an active engine thrust target. In the exemplary embodiment, the thrust target can be "MAXTO", "NADP" or "MAXCLB" to indicate take-off thrust, NADP reduced thrust and climb mode thrust, respectively. In embodiments, the thrust limit indicator 134 visually differentiates the NADP text (e.g by using different colors) to indicate whether NADP is armed, active or exiting. The specific alphanumeric formulations used to indicate the flight mode annunciation can be varied as desired.

In FIG. 7B, a first example flight mode annunciator 130A is shown having varying display outputs during the course of an NADP take-off without the autopilot and auto-throttle system 22 engaged. In stage 1, the aircraft 12 is preparing for take-off and the thrust parameter indicator 140 is set to N1, the vertical mode is set to TO and the speed target 138 is set to V2+. In stage 2, the aircraft 12 takes-off at take-off thrust N1. The take-off thrust indicator 140 N1 in stage 2 is colored (or otherwise visually differentiated) differently from the take-off thrust indicator 140 N1 in stage 1 to show that the take-off thrust has been realized in stage 2. In stage 3, the thrust limit target indicator 134 includes an indication that the engine thrust is being reduced to NADP thrust, whilst the speed target remains at V2+. The commencement of engine thrust reduction to NADP thrust occurs at the initial altitude. In stage 4, the thrust limit target indicator 134 NADP is colored (or otherwise visually differentiated) to that of stage 3 to show that the reduced NADP engine thrust has been realized. In stage 5, which corresponds to the acceleration altitude, the engine thrust remains at NADP, but the speed target indicator 138 has been changed from V2+ to the final take-off speed VFT. In stage 6, engine thrust has been increased to normal en-route climbing thrust and the thrust limit indicator 134 has been changed to a blank area. In embodiments, the NADP text of the thrust limit indicator 134 is colored differently in stage 3 to stages 4 and 5 to indicate armed and active NADP states. Further, another different color (not shown) and/or flashing text (or other visual differentiation) may be provided between stages 5 and 6 to indicate NADP exiting or lack of compliance with NADP.

In FIG. 7B, a second example flight mode annunciator 130B is shown having varying display outputs during the course of an NADP take-off with the autopilot and auto-throttle system 22 engaged. That the auto-throttle is utilized during take-off in the second example flight mode annunciator 130B is illustrated by A/T appearing in the auto-throttle status indicator 132 whereas the first example flight mode annunciator has the auto-throttle status indicator 132 blank. In stage 1, the setting of the auto-throttle to MAXTO in preparation for take-off is shown in the thrust limit indicator 134. In stage 2, the color of MAXTO is changed in the thrust limit indicator 134 to indicate that take-off thrust MAXTO has been realized by the auto-throttle. In stage 3, the initial altitude is reached and the auto-throttle is reducing to NADP thrust as shown in the thrust limit indicator 134. The NADP thrust is realized in stage 4, which is illustrated by a changed color (e.g. green versus cyan) of the text in the thrust limit indicator 134 as compared to that of stage 3. In stage 5, the acceleration altitude is reached and the speed target is changed from V2+ to final take-off speed VFT, which is shown in the speed target indicator 138. In stage 5, the engine thrust remains at NADP thrust, which is shown by the text in the thrust limit indicator 134. In stage 6, the end altitude is reached, which means that the auto-throttle engine thrust is set to increase to MAXCLB from the NADP thrust as shown by the thrust limit indicator 134.

FIG. 8 is a process flow chart detailing a method 200 for generating and display NADP related display cues. Method 200 is executed by the aircraft system 10 of FIG. 2. The order of operation within the method 200 is not limited to the sequential execution as illustrated in the figure, but may be performed in one or more varying orders as applicable and in accordance with the present disclosure. Steps of the method 200 are performed by the one or more processors 24 of the processing system 20 and the FMS 16 executing computer programming instructions included in at least the computer program 28. Method 200 may be instigated when the pilot enters the flight plan into the FMS 16 prior to take-off including various NADP parameters. The method 200 may run continually during the take-off phase of a flight so that the NADP presentations described with respect to the method 200 are continually updated based on progress of the aircraft 12 along the NADP as reported by the FMS data 28.

In step 210, NADP parameters are received by the FMS 16. NADP parameters may be entered by the flight crew on the user interface 18 (e.g. a user interface of a flight management controller), may be automatically derived based on the flight plan, may be entered from an external source or a combination thereof. As described herein, the NADP parameters include the initial altitude, the acceleration altitude, the climb excitement altitude and the end altitude.

The method 200 includes various steps of generating NADP relevant display features based on NADP relevant data included in the FMS data 28. The NADP relevant display features are generated by the display generation module 26 for output to the display device 14. These display features will be described with reference to steps 220 to 270. It is within the scope of the present disclosure for the NADP display features of steps 220 to 270 to be provided independently of one another, entirely in combination or in any combination of a subset of the display features.

In step 220, and with reference to FIGS. 3A to 3D, the VSD 50 is generated, by the display generation module 26, including the NADP parameters. In particular, point indicators of the initial altitude 56a, the acceleration altitude 56b, the climb excitement altitude 56c and the end altitude of the NADP are included along a vertical profile of the take-off phase of the flight plan. Similar point indicators may be included in the PFD.

Figure 5B:
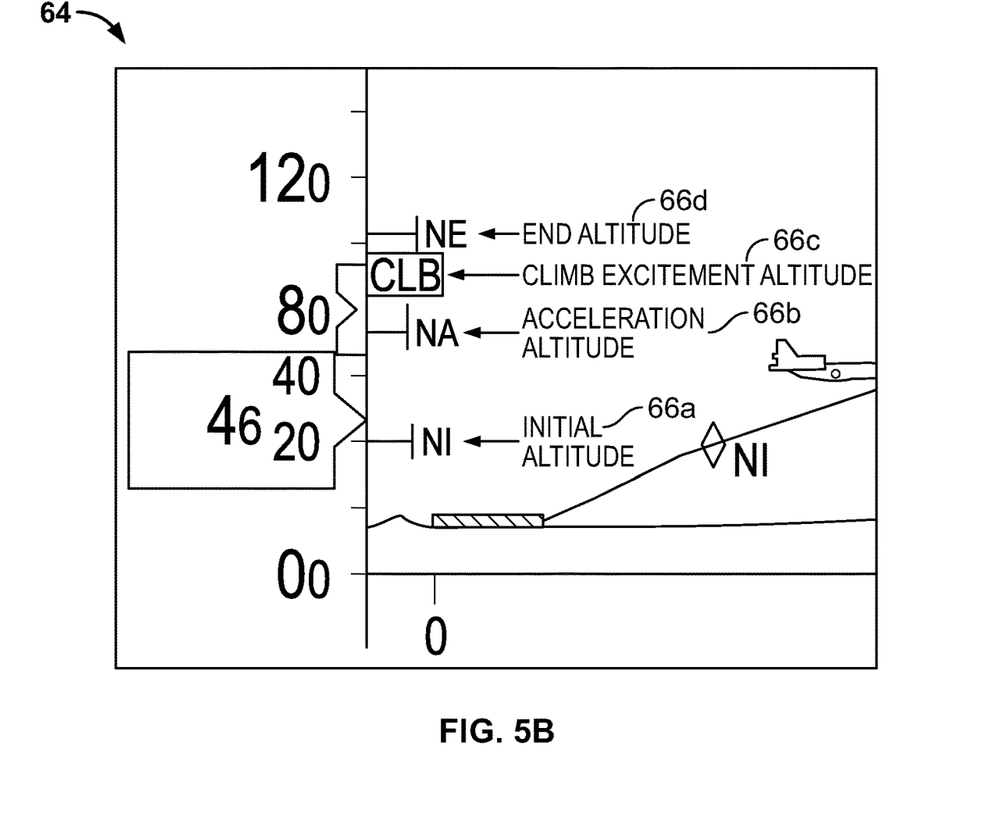

In step 230, and with reference to FIGS. 5A and 5B, the altitude tape 64 of the VSD 50 and/or the altitude tape 70 of the PFD is generated so as to include markings 66a to 66d and 72a to 72d corresponding to the initial altitude, the acceleration altitude, the climb excitement altitude and the NADP end altitude.

In step 240, and with reference to FIG. 4A, the NADP status annunciation 58 is generated. In one form, the NADP status annunciation 58 indicates when the NADP is active when engine thrust has been reduced to NADP thrust in compliance with the NADP. In another form, the NADP status annunciation 58 indicates when the NADP is inactive when the NADP has been defined but is not yet armed. In a yet further form, the NADP status annunciation 58 indicates when the NADP is armed when the aircraft 12 is flying a take-off with the NADP planned but engine thrust has not yet been reduced to NADP thrust. In a further form, the NADP status annunciation 58 indicates when the NADP is exiting and thrust is returning or has returned to normal. Further, the NADP armed or the NADP active status annunciations 58 may have visually different versions to differentiate when the engine thrust is in the process of being changed to NADP thrust. For example, the NADP armed status annunciation 58 may have one color when engine thrust is at take-off thrust and another color when engine thrust is reducing from take-off thrust to NADP thrust. Alternatively, this color change may be implemented by the NADP Armed status annunciation 58 by having different colors when the engine thrust is reducing to NADP thrust and when NADP thrust is realized. The NADP status annunciation 58 can be included on the VSD 50, the PFD or any cockpit display device 14.

In step 250, and with reference to FIG. 4B, the method includes generating the NADP exiting annunciations 68 to indicate a cause for exiting the NADP. Causes that are detectable by the FMS 16 include reaching the NADP end altitude, detection of an engine out condition, manual cancellation through the user interface 18, non-compliance of the aircraft 12 with the NADP (e.g. based on engine thrust and altitude), auto-throttle disengagement by manual override and selection of climb thrust before end of NADP through selection on user interface 18. Any one or all, or any combination of a subset, of these causes can be indicated in different NADP exiting annunciations 68. The NADP exiting annunciations 68 can be included in the VSD 50, the PFD or any cockpit display device 14.

In step 260, and with reference to FIGS. 6A to 6C, the engine display 80 is generated to include one or more NADP indications including the NADP bug 82 providing a reference mark for the NADP reduction thrust. The NADP bug 82 is generated to be visually differentiated (e.g. differing colors) depending on the NADP status. The NADP status can include NADP inactive when the NADP procedure is setup and ready, NADP armed when the NADP thrust reduction is in progress and NADP active when the NADP thrust reduction has been realized.

In step 270, and with reference to FIGS. 7A and 7B, the flight mode annunciator 130 is generated to include one or more NADP indicators. The flight mode annunciator 130 includes the thrust limit indicator 134, which displays when NADP thrust is the target engine thrust. Further, the NADP thrust indication is visually differentiated depending upon whether the engine thrust reduction is in progress or whether NADP thrust has been realized.

In step 280, the NADP displays of any one or more of steps 220 to 270 are output to the display 14 for enhanced flight crew situation awareness when flying an NADP.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system for an aircraft, comprising:
a display device;
a flight management system (FMS);
a user interface;
an autopilot and auto-throttle system;
at least one processor in operable communication with the display device, the FMS, the autopilot and auto-throttle system and the user interface, the at least one processor configured to execute program instructions, wherein the program instructions are configured to cause the at least one processor to:
receive noise abatement departure procedure (NADP) parameters entered into the FMS via the user interface or otherwise provided by the FMS, wherein the NADP parameters include:
an initial altitude at which engine thrust should be reduced from take-off thrust to NADP thrust;
an acceleration altitude at which the aircraft should begin accelerating to a final take-off speed;
a climb excitement altitude at which a climb mode is entered whilst maintaining the NADP thrust;
an end altitude at which an NADP should be exited and the engine thrust should be increased from the NADP thrust; and
generate a vertical situation display for the display device indicating the NADP parameters on a flight path indication;
generate NADP annunciations on the vertical situation display based on data from the FMS, the NADP annunciations including:
an NADP inactive indicator between take-off and the initial altitude;
an NADP armed indicator at the initial altitude when the engine thrust is to be reduced to the NADP thrust;
an NADP active indicator when the engine thrust is at the NADP thrust;
an NADP exiting indicator when the end altitude has been reached and the engine thrust can be increased;
execute the NADP by flying the aircraft using the autopilot and auto-throttle system to:
take-off with the take-off thrust;
reduce the thrust to the NADP thrust at the initial altitude;
accelerate the aircraft speed to the final take-off speed at the acceleration altitude;
enter a vertical mode at the climb excitement altitude; and
exit the NADP and increase thrust to a maximum climbing thrust at the end altitude.

2. The aircraft system of claim 1,
wherein the program instructions are configured to cause the at least one processor to:
generate an altitude tape display for the display device or another display device of the aircraft system, the altitude tape display including NADP bugs indicating the NADP parameters.

3. The aircraft system of claim 2, wherein the altitude tape display is output on the vertical situation display and a primary flight display.

4. The aircraft system of claim 1,
wherein the program instructions are configured to cause the at least one processor to:
generate an engine display indicating a current engine thrust and a reference indication of the NADP thrust.

5. The aircraft system of claim 4, wherein the reference indication of the NADP thrust is visually differentiated when the NADP is inactive, when the NADP is armed at the initial altitude, and when the current engine thrust is at the NADP thrust, which is determined based on data from the FMS.

6. The aircraft system of claim 1,
wherein the program instructions are configured to cause the at least one processor to:
generate one or more NADP status annunciations on the vertical situation display based on data from the FMS, the NADP status annunciations including at least one of:

different NADP exit status indications;
a manual override of auto-throttle status indicator; and
a maximum climb throttle setting status indictor.

7. The aircraft system of claim 1,
wherein the program instructions are configured to cause the at least one processor to:
generate flight mode annunciations for the display device or another display device, the flight mode annunciations including:
a vertical mode indicator indicating a take-off mode;
a speed target indicator indicating a target climb speed; and
a thrust indicator indicating when NADP thrust is realized.

8. The aircraft system of claim 7, wherein the thrust indicator displays the indication of NADP thrust differently when the engine thrust is reducing to NADP thrust and when the NADP thrust is realized.

9. A method for generating a vertical situation display for a noise abatement departure procedure (NADP) in an aircraft system for an aircraft, the method comprising:
receiving, via at least one processor, NADP parameters entered into a flight management system (FMS) on a user interface of the aircraft system or otherwise provided by the FMS, wherein the NADP parameters include:
an initial altitude at which engine thrust should be reduced from take-off thrust to NADP thrust;
an acceleration altitude at which the aircraft should begin accelerating to a final take-off speed;
a climb excitement altitude at which a climb mode is entered; and
an end altitude at which an NADP should be exited and the engine thrust is increased from the NADP thrust;
generating, via the at least one processor, a vertical situation display for a display device of the aircraft system indicating the NADP parameters on a flight path indication;
generating, via the at least one processor, NADP annunciations on the vertical situation display based on data from the FMS, the NADP annunciations including:
an NADP inactive indicator between take-off and the initial altitude;
an NADP armed indicator at the initial altitude when the thrust is to be reduced to the NADP thrust;
an NADP active indicator when the thrust is at the NADP thrust;
an NADP exiting indicator when the end altitude has been reached and thrust can be increased; and
executing the NADP by flying the aircraft using an autopilot and an auto-throttle system to:
take-off with the take-off thrust;
reduce the engine thrust to the NADP thrust at the initial altitude;
accelerate the aircraft speed to the final take-off speed at the acceleration altitude;
set the climb mode at the climb excitement altitude; and
exit the NADP and increase the engine thrust to a maximum climbing thrust at the end altitude.

10. The method of claim 9, comprising generating, via the at least one processor, an altitude tape display for the display device or another display device of the aircraft system, wherein the altitude tape display including NADP bugs indicating the NADP parameters.

11. The method of claim 10, wherein the altitude tape display is output on the vertical situation display and a primary flight display.

12. The method of claim 9, comprising generating, via the at least one processor, an engine display indicating current engine thrust and a reference indication of the NADP thrust.

13. The method of claim 12, wherein the reference indication of the NADP thrust is visually differentiated when the NADP is inactive, when the NADP is armed at the initial altitude, and when the current engine thrust is at the NADP thrust, which is determined based on data from the FMS.

14. The method of claim 9, comprising generating, via the at least one processor, one or more NADP status annunciations on the vertical situation display based on data from the FMS, the NADP status annunciations including at least one of:
different NADP exit status indications;
a manual override of auto-throttle status indicator; and
a maximum climb throttle setting status indictor.

15. The method of claim 9, comprising generating flight mode annunciations for the display device or another display device, the flight mode annunciations including:
a vertical mode indicator indicating a take-off mode;
a speed target indicator indicating a target climb speed; and
a thrust indicator indicating when NADP thrust is realized.

16. The method of claim 15, wherein the thrust indicator displays the indication of NADP thrust differently when the engine thrust is reducing to NADP thrust and when the NADP thrust is realized.

* * * * *